United States Patent
Golightly et al.

(10) Patent No.: US 8,192,866 B2
(45) Date of Patent: Jun. 5, 2012

(54) TIN NANOPARTICLES AND METHODOLOGY FOR MAKING SAME

(75) Inventors: Justin S. Golightly, Sunnyvale, CA (US); Alfred A. Zinn, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 501 days.

(21) Appl. No.: 12/397,250

(22) Filed: Mar. 3, 2009

(65) Prior Publication Data
US 2009/0226812 A1 Sep. 10, 2009

Related U.S. Application Data

(60) Provisional application No. 61/033,719, filed on Mar. 4, 2008.

(51) Int. Cl.
*H01M 4/38* (2006.01)
(52) U.S. Cl. .................................. 429/218.1; 75/343
(58) Field of Classification Search ............... 75/343; 429/218.1
See application file for complete search history.

(56) References Cited

U.S. PATENT DOCUMENTS

| | | | |
|---|---|---|---|
| 5,159,171 A | 10/1992 | Cook et al. | |
| 5,358,546 A * | 10/1994 | Rieke | 75/252 |
| 6,645,444 B2 | 11/2003 | Goldstein | |
| 7,559,970 B2 | 7/2009 | Kim et al. | |
| 7,628,840 B2 | 12/2009 | Atsuki et al. | |
| 7,780,758 B2 * | 8/2010 | Park et al. | 75/370 |
| 7,847,397 B2 | 12/2010 | Wu et al. | |
| 7,850,933 B2 | 12/2010 | Yang et al. | |
| 7,858,025 B2 | 12/2010 | Shim et al. | |
| 2006/0046447 A1 | 3/2006 | Yamamoto | |
| 2007/0202304 A1 | 8/2007 | Golovko et al. | |
| 2007/0298536 A1 | 12/2007 | Ren et al. | |
| 2008/0278181 A1 | 11/2008 | Zhong et al. | |
| 2009/0214764 A1 | 8/2009 | Li et al. | |
| 2009/0301606 A1 | 12/2009 | Ueshima | |

FOREIGN PATENT DOCUMENTS

| | | |
|---|---|---|
| WO | WO 2008/023944 A1 | 2/2008 |
| WO | WO 2009/115643 | 9/2009 |
| WO | WO/2010/036114 | 4/2010 |

OTHER PUBLICATIONS

Kanninen, et al., "Influence of Ligand Structure on the Stability and Oxidation of Copper Nanoparticles", Journal of Colloid and Interface Science 318 (2008) pp. 88-95.
Lisiecki, et al., "Control of the Shape and the Size of Copper Metallic Particles", J. Phys. Chem 1996, 100, pp. 4160-4166.
Mott, et al., "Synthesis of Size-Controlled and Shaped Copper Nanoparticles", Langmuir 2007, 23, pp. 5740-5745.
Wu, et al., "Simple One-Step Synthesis of Uniform Disperse Copper Nanoparticles", Mater. Res. Soc. Symp. Proc. vol. 879E, 2005 Materials Research Society, pp. Z6.31-Z6.3.6.
Wu, et al., "One-Step Green Route to Narrowly Dispersed Copper Nanocrystals", Journal of Nanoparticle Research (2006) pp. 965-969.
Yeshchenko, et al., "Size-Dependent Melting of Spherical Copper Nanoparticles Embedded in a Silica Matrix", Physical Review B 75 (2007), pp. 085434-1 to 085434-6.
Pulkkinen, et al., "Poly(ethylene imine) and Tetraethylenepentamine as Protecting Agents for Metallic Copper Nanoparticles", Applied Materials & Interfaces, (2009) vol. 1, No. 2, pp. 519-525.
Lavinia Belan, et al., "Novel low-temperature synthesis of tin(0) nanoparticles," Materials Letters 59, pp. 1080-1084 (2005).
Chung-Sung Yang, et al., "Synthesis and Characterization of Sn/R, Sn/Si-R, and Sn/SiO$_2$ Core/Shell Nanoparticles," Chem. Mater, vol. 12, No. 4, pp. 983-988 (2000).
Yoojung Kwon, et al., "Effect of Capping Agents in Tin Nanoparticles on Electrochemical Cycling," Electrochemical and Solid-State Letters, 9 (1), A34-A38 (2006).
Lavinia Belan, et al., "A new organometallic synthesis of size-controlled tin(0) nanoparticles," Nanotechnology vol. 16, pp. 1153-1158 (May 17, 2005).
Yanbao Zhao, et al., "Preparation of tin nanoparticles by solution dispersion," Materials Science and Engineering, vol. A359, pp. 405-407 (May 2003).

\* cited by examiner

*Primary Examiner* — Stuart Hendrickson
(74) *Attorney, Agent, or Firm* — McDermott Will & Emery LLP

(57) ABSTRACT

A method of preparing tin (Sn) nanoparticles based on a bottom-up approach is provided. The method includes combining a first solution comprising Sn ions with a second solution comprising a reducing agent. After the combination, the Sn ions and the reducing agent undergo a reaction in which at least some of the Sn ions are reduced to Sn nanoparticles. The first solution comprises a tin salt dissolved in a solvent; the second solution comprises an alkali metal and naphthalene dissolved in a solvent; and the combined solution further comprises a capping agent that moderates a growth of aggregates of the Sn nanoparticles.

16 Claims, 3 Drawing Sheets

TIN NANOPARTICLES AND METHODOLOGY FOR MAKING SAME

CROSS-REFERENCE TO RELATED APPLICATION

This application claims priority from U.S. Provisional Patent Application No. 61/033,719, filed on Mar. 4, 2008, which is incorporated herein by reference.

STATEMENT REGARDING FEDERALLY SPONSORED RESEARCH OR DEVELOPMENT

Not applicable.

FIELD

Embodiments of the present invention generally relate to tin nanoparticles and methodologies for synthesizing same. The disclosure enjoys particular utility in the manufacture of advanced, high capacity batteries, e.g., reserve-activated batteries.

BACKGROUND

Tin (Sn) has a specific charge capacity of about 1,000 mAh/gm in electrochemical applications, e.g., batteries. Current advanced, state-of-the-art Li-based batteries typically utilize carbon (C), i.e., graphite, as a negative electrode material having a charge capacity of about 372 mAh/gm. A great amount of research is being performed with the aim of increasing the charge capacity of batteries, with tin and silicon (Si) currently being candidates for use in advanced lithium (Li)-based batteries.

If the charge capacities of materials presently available for Li-based batteries were increased by a factor of two or more, manufacture of lighter batteries or batteries with larger charge profiles, or with longer service lifetimes would be facilitated. Such improvement in battery capacities would have a great impact in a multitude of technologies ranging from hand-held electronic devices, e.g., mobile phones, to space-based systems and vehicles. However, several problems are encountered with the use of Sn in Li-based batteries, including volume expansion due to intercalation of the Li. The result is an immediate and drastic reduction in the charge/discharge capacity after charging, as well as device failure.

Batteries containing materials comprising Li and Sn typically exhibit an immediate improvement vis-à-vis conventional Li-based batteries, but the improvement dissipates with use, i.e., over several charge/discharge cycles. Improvements in the performance of such materials in battery applications have been obtained by reducing the sizes of individual grains (i.e., particles). By reducing the particle size, the volume expansion upon intercalation can be diminished. Methods for reducing the size of Sn particles typically rely on a "top-down" approach in which larger particles are made smaller. The most common of these methods are mechanical, e.g., use of a ball mill for reducing the size of larger particles to achieve desired smaller particle sizes. Disadvantageously, however, such methods generally result in 0.5 micron or larger sized materials, with poor-to-moderate control over specific particle size. Often times, milling material abrades and contaminates the sample.

In view of the foregoing, there exists a need for improved approaches and methodologies for producing very small Sn particles, e.g., nano-sized particles, of specified particle size or range of sizes, suited for use in the development of improved electrochemical power sources, e.g., advanced Li-based batteries.

SUMMARY

Embodiments described herein provide tin (Sn) nanoparticles suitable for making advanced Li-based batteries by reducing tin ions with a particularly effective reducing agent comprising an alkali metal and naphthalene to form aggregates of Sn nanoparticles having a desirable and controlled size.

Certain embodiments provide a method for preparing tin (Sn) nanoparticles. The method comprises combining a first solution comprising Sn ions with a second solution comprising a reducing agent. After the combination, the Sn ions and the reducing agent undergo a reaction in which at least some of the Sn ions are reduced to tin nanoparticles. The first solution can comprise a tin salt dissolved in a solvent. The second solution can comprise an alkali metal and naphthalene dissolved in a solvent. The combined solution can further comprise a capping agent that moderates a growth of aggregates of the tin nanoparticles.

Certain embodiments provide a battery comprising one or more anode electrodes. The one or more anode electrodes can comprise aggregates of tin (Sn) nanoparticles coupled to conductive additives. The Sn nanoparticle aggregates can be prepared by providing a mixture solution comprising at least Sn ions, an alkali metal, naphthalene, and a capping agent, wherein the Sn ions and the alkali metal undergo a reaction in which at least some of the Sn ions are reduced to aggregates of Sn nanoparticles.

It is to be understood that both the foregoing summary and the following detailed description are exemplary and explanatory and are intended to provide further explanation of the embodiments as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the disclosed and claimed embodiments. It will be apparent, however, to one ordinarily skilled in the art that the embodiments may be practiced without some of these specific details. In other instances, well-known structures and techniques have not been shown in detail to avoid unnecessarily obscuring the disclosure. The word "exemplary" is used herein to mean "serving as an example, instance, or illustration." Any embodiment or design described herein as "exemplary" is not necessarily to be construed as preferred or advantageous over other embodiments or designs.

Broadly stated, the present disclosure is based upon discovery that, in contradistinction to the prior "top-down"

approach and methodology for producing very small Sn particles, e.g., nano-sized particles, a "bottom-up" synthesis approach is advantageous for obtaining ultra-small Sn particles of specified particle size or range of sizes, especially suited for use in the development of improved electrochemical power sources, e.g., advanced Li-based batteries. Methodologies according to the present disclosure are capable of synthesizing Sn nanoparticles having sizes as small as a few nanometers in diameter and up to several hundreds of nanometers. Sn nanoparticles synthesized according to the presently disclosed "bottom-up" methodology are smaller than those made by conventional "top-down" methodology, e.g., ball milling. Further, the "bottom-up" approach facilitates tailoring of particle sizes for obtaining optimum electrochemical properties. In addition, the surface characteristics of the nanoparticles may be adjusted, which feature is important for obtaining wettability of the particles with the electrolyte solution—a requirement for good battery performance. Finally, according to the "bottom-up" approach, the surface morphology of the nanoparticles, which dictates electrical conductivity and reactivity, can be tailored for specific applications.

Additional advantages and aspects of the present disclosure will become readily apparent to those skilled in the art from the following detailed description, wherein embodiments of the present methodology are shown and described, simply by way of illustration of the best mode currently contemplated for practicing the methodology described herein. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

Figure 1:
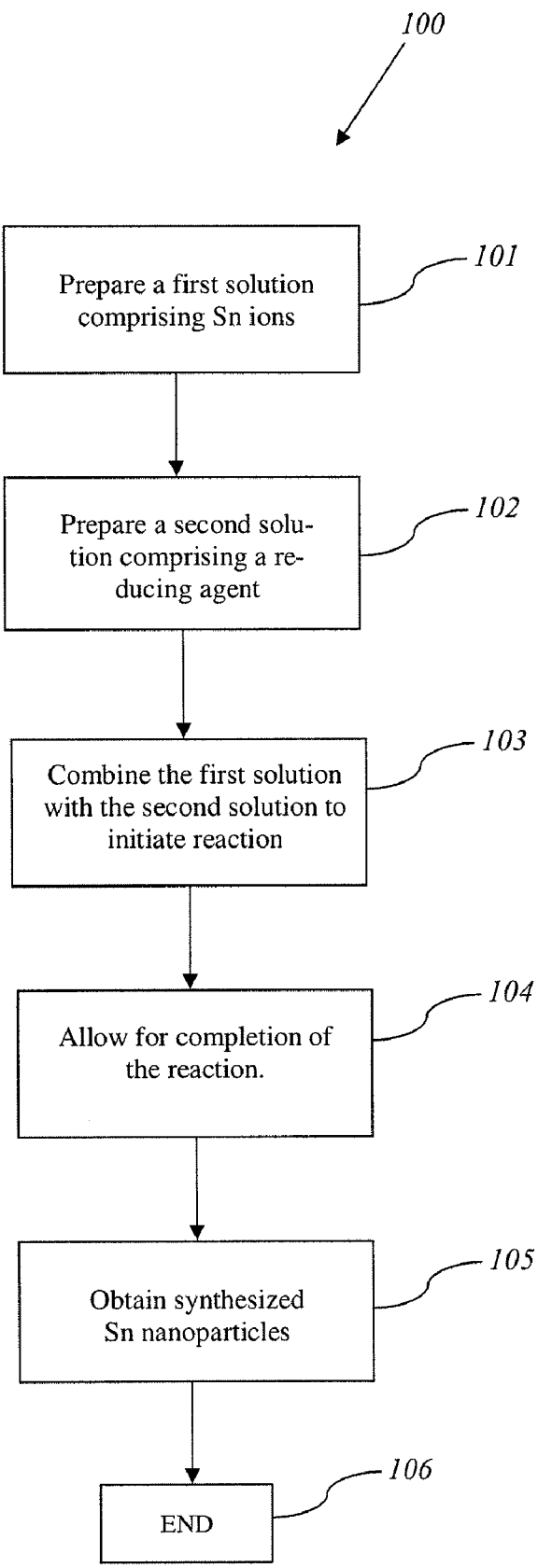
FIG. 1 is a flowchart illustrating an exemplary process for preparing tin (Sn) nanoparticles and aggregates thereof based on a bottom-up approach according to certain disclosed embodiments.

More specifically, according to the "bottom-up" approach of the present disclosure, a compound of tin, e.g., a tin salt, is reduced to metallic tin. FIG. 1 is a flowchart illustrating an exemplary process 100 for preparing tin nanoparticles and aggregates thereof based on a bottom-up approach. The process 100 begins at a state 101 in which a first solution comprising Sn ions is prepared by adding a tin salt to a solvent. Suitable tin salts include anhydrous and hydrated tin chlorides, specifically tin (II) chloride ($SnCl_2$) and tin (IV) chloride ($SnCl_4$). By way of illustration only, the following steps are described with respect to an exemplary synthetic route utilizing a tin salt. In the exemplary synthetic route, 20 mmol of $SnCl_2 \cdot 2H_2O$ and 20 mmol hydrobenzamide (tribenzaldiamine) were added to 20 mL of THF (tetrahydrofuran) and heated to about 60° C. under an argon (Ar) atmosphere. However, the bottom up approach of the present disclosure is not limited to the exemplary synthetic route.

The process 100 proceeds to a state 102 in which a second solution comprising a reducing agent is prepared. In the exemplary synthetic route, 45 mmol of elemental sodium (Na) and 48 mmol of naphthalene were dissolved in 50 mL of THF in a separate flask, also under an Ar atmosphere. This procedure resulted in sodium naphthalide solution. In the reducing reaction to be described below, the naphthalene provides a catalyst or a capture agent which captures Na ions and allows them to efficiently release electrons, which electrons then reduce tin (e.g., $Sn^{+2}$) ions to synthesize Sn nanoparticles.

The process 100 proceeds to a state 103 in which the first solution is combined with the second solution to initiate a chemical reaction. In the illustrated example, the combination was achieved by transferring the sodium naphthalide solution, via a cannula, to the $SnCl_2$ solution, for initiating a reaction in which the $Sn^{+2}$ ions of the $SnCl_2$ are reduced to Sn. This reaction takes place in oxygen-free environment (using standard Schlenk techniques).

In this reaction, the hydrobenzamide serves as a "capping" agent which moderates the growth of aggregates of Sn nanoparticles. For example, the capping agent, such as the hydrobenzamide, controls (e.g., forestalls, limits, retards) the aggregation of the Sn nanoparticles by attaching to the Sn nanoparticles and providing a steric hindrance to restrict growth and prevent aggregation. In general, the size of the nanoparticles can be determined at least in part by a combination of factors including: (1) the hydrobenzamide concentration; (2) the reaction temperature; and (3) the duration of reaction. In this reaction, the elemental sodium (Na) acts as the reducing agent for reducing the tin (II) chloride ($SnCl_2$) by means of the following reaction:

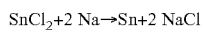

$$SnCl_2 + 2\,Na \rightarrow Sn + 2\,NaCl$$

The process 100 proceeds to a state 104 in which the reaction is allowed to proceed and be completed. Excess sodium is provided to ensure that the reaction proceeds to completion and to assist in removal of the hydrate, i.e., water, from tin salt (which may arise from an as provided hydrated salt or contamination). The duration of the reduction reaction can be on the order of minutes to several hours, depending on various factors such as the desired median size of the Sn nanoparticles, the particular capping agent used, and the reaction temperatures.

The process 100 proceeds to a state 105 in which solvent is removed and dry samples of synthesized Sn nanoparticles are obtained after a purification process. Such a purification process to obtain synthesized nanoparticles is well known in the art. In an exemplary process, a solution containing the synthesized nanoparticles are separated into a polar phase and a non-polar (organic) phase. The nanoparticles can be obtained, e.g., collected, from the non-polar phase of the solution. The process ends at state 106.

While the process 100 illustrates an exemplary bottom-up methodology, it shall be appreciated by those skilled in the art in view of the present disclosure that many alternatives to the illustrated process are possible. For example, the preparation of the second solution (102) can occur prior to or concurrently as the preparation of the first solution (101). In addition, stoichiometries (i.e., hydrobenzamide/sodium/naphthalene ratios) other than those described in the foregoing illustrative example may also be utilized.

In an alternative experimental embodiment, a reaction described by

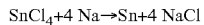

$$SnCl_4 + 4\,Na \rightarrow Sn + 4\,NaCl$$

may be performed with the tin (IV) chloride ($SnCl_4$), as follows: A first solution comprising 1 molar equivalent of $SnCl_4$ and 1 molar equivalent of capping agent (trioctylphosphine) dissolved in THF is prepared. A second solution comprising 4:3 molar equivalent of sodium:naphthalene dissolved in THF is prepared. The second solution is added to the first solution, and the mixture solution is stirred at 60 C for 1 hr. The anhydrous material requires extreme care and must be handled in an oxygen-free environment. This reaction produced aggregates of Sn nanoparticles having a median size of about 20 nm, as determined by XPS studies to be described below with respect to FIG. 2, and SEM and STEM studies to be described below with respect to FIGS. 3A and 3B. As a variation on the above alternative experimental embodiment, the tin (IV) chloride can be added directly to the sodium naphthalene solution instead of preparing a separate solution comprising the $SnCl_4$.

In yet another alternative experimental embodiment, a first solution comprising 1 molar equivalent of $SnCl_2 \times 2H_2O$ mixed in THF with certain molar equivalents of capping agent (e.g., 2 mol eq triphenyl phosphine, 1 mol eq hydrobenzamide, etc.) effective to produce nanoparticle aggregates having a target median size is prepared. A second solution comprising a 5:3.5 (excess sodium—4.5:3 used also) molar equivalent of sodium:naphthalene dissolved in THF is prepared. The second solution is then added to the first solution, and the mixture solution is stirred at a temperature varying from room temp to 80 C and for a reaction time that can be varied from 10 minutes to 2 hrs. Common reaction time was 30 min.

Furthermore, capping agents other than hydrobenzamide, such as, for example and without limitation triphenylphosphine (TPP), trioctylphosphine (TOP), cetyltributylammonium bromide (CTAB), hexylamine, and butylamine may be utilized. Other suitable capping agents may include different functional groups, such as, for example and without limitation, alcohols, thiols, and carboxylates. Additionally, while the illustrated reaction employed sodium as a reducing metallic agent, other metallic elements including alkali metals such as lithium (Li) and potassium (K) can be employed instead. For example in place of the sodium/napthalene combination as the reducing agent, a number of other reducing agents, e.g., sodium borohydride and butyl lithium, may be employed. Other usable solvents, depending upon the reducing agent and the desired end products, include glycol ethers, ethylenediamine, and water. Examples of the glycol ethers include glyme and triglyme.

Reducing agents employing naphthalene as an initiator (e.g., sodium naphthalide) were experimentally shown to be superior compared to reactions employing other types of reducing agents (e.g., sodium borohydride and butyl lithium), in terms of the variety of capping agents that can be used and the degree of control that can be exercised over the size of the Sn nanoparticles by varying the concentration of the capping agents. These superior characteristics of reducing agents comprising naphthalene molecules as the catalyst can be attributed to the molecule's superior capability to capture the alkali metals and facilitate the release electrons from the captured metals. The high reducing capability of the naphthalide solution allows one the ability to efficiently reduce the variety of tin salts used for the disclosed reactions. The capping agent used for the reactions is designed to function as an inhibitor in the sense that it slows the reduction of the Sn ions while also providing a protected surface to prevent aggregation. By controlling the reaction rate, one can take advantage of the excellent reducing capacity offered by using a sodium solution (e.g., sodium naphthalide).

Figure 2:
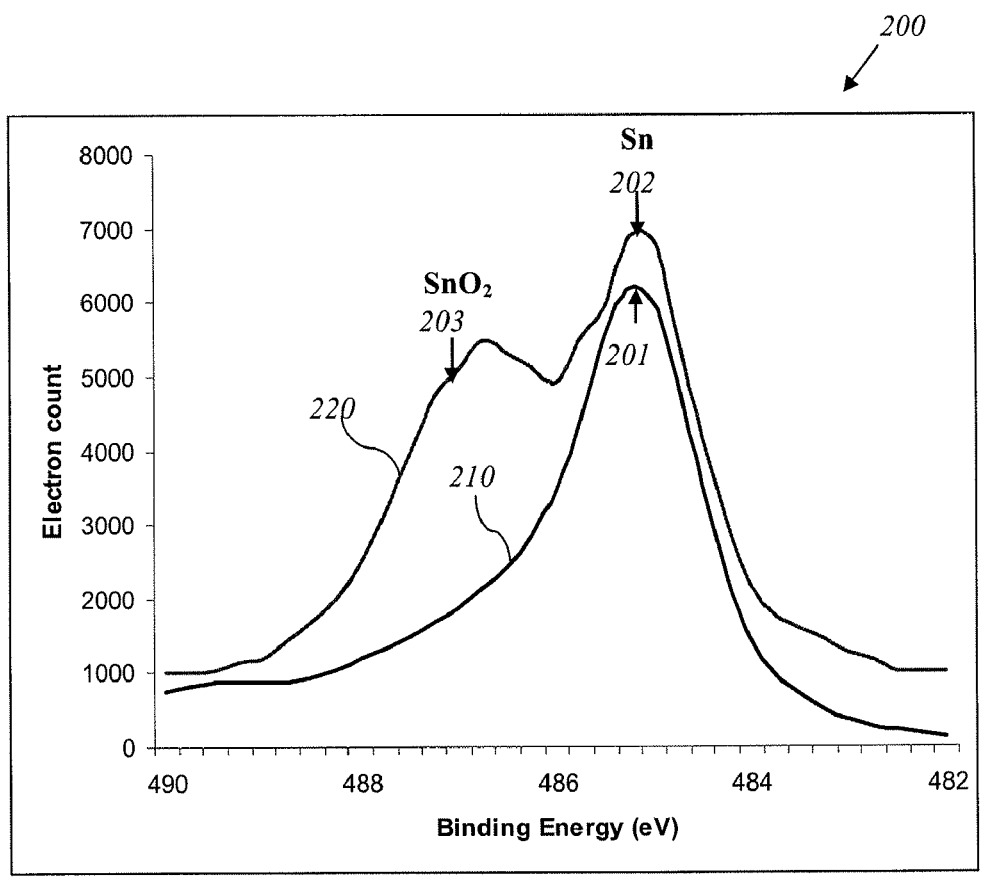
FIG. 2 is a graph illustrating the results of X-ray photoelectron spectra (XPS) studies indicating ability of methodologies according to the present disclosure to synthesize Sn nanoparticles or Sn nanoparticles having a $SnO_2$ shell.

X-ray photoelectron spectra (XPS) studies were performed on dry samples in order to measure/determine the composition of the nanoparticles. FIG. 2 is a graph 200 illustrating the results of X-ray photoelectron spectra (XPS) studies indicating ability of the methodology according to the present disclosure to synthesize Sn nanoparticles or Sn nanoparticles having a $SnO_2$ shell. The graph 200 includes two traces 210 and 220 corresponding to XPS spectra of two different Sn nanoparticle samples. The trace 210 shows a binding energy peak 202 associated with Sn nanoparticles, indicating that the corresponding sample is comprised almost exclusively of Sn nanoparticles.

On the other hand, the trace 220 shows a binding energy peak 201 associated with Sn nanoparticles as well as a binding energy peak 203 associated with tin oxide ($SnO_2$), indicating that the corresponding sample is comprised of Sn nanoparticles and one or more $SnO_2$ shells at least partly surrounding the Sn nanoparticles. Such surrounding SnO shells can advantageously provide solid electrolyte interface (SEI) layers that can prevent active materials (e.g., Sn nanoparticles) from being transported from their current locations to separator materials. In one aspect, by selecting a suitable capping agent, it is possible to produce Sn nanoparticles having $SnO_2$ shells (as evidenced by the trace 220). For example, the use of capping agents such as hexylamine, butylamine, and trioctylphosphine, is conducive to the formation of the $SnO_2$ shells because the capping agents, while controlling the aggregation of the nanoparticles, have a decreased ability in protecting the Sn nanoparticles from oxidation. As a result, the Sn nanoparticles located on the outer surface of a Sn aggregate become oxidized to form a $SnO_2$ shell surrounding the interior Sn nanoparticles.

Figure 3A:
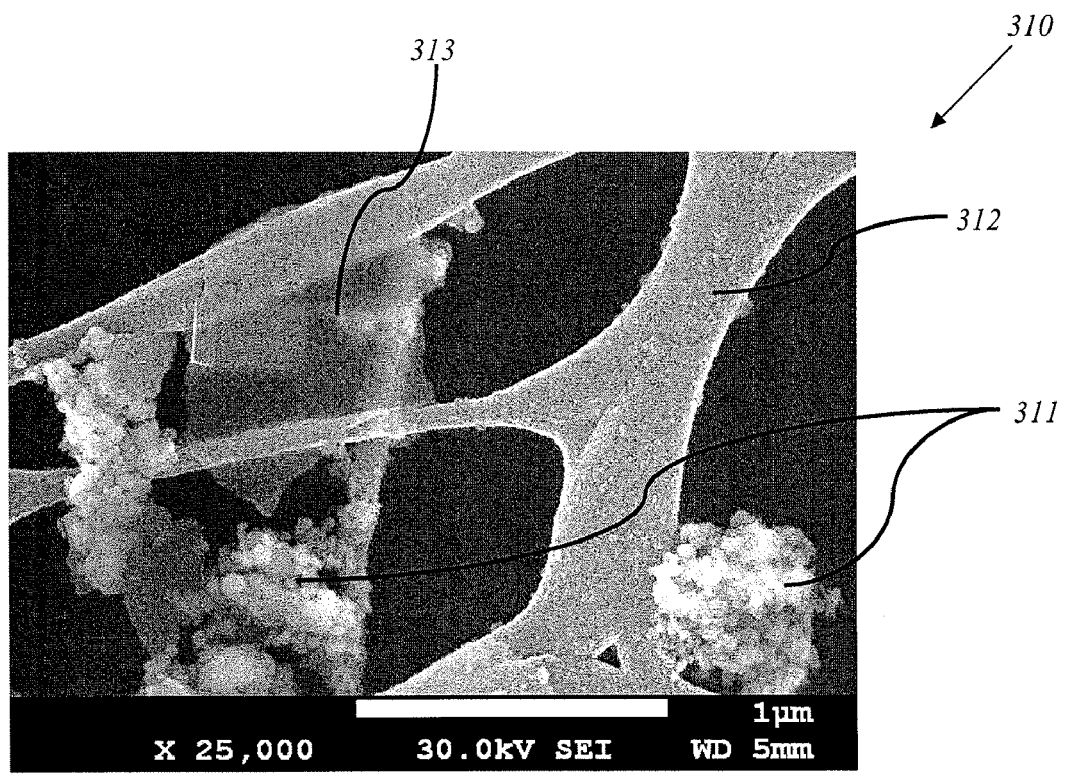
FIG. 3A and FIG. 3B are scanning electron microscopy (SEM) and scanning transmission electron microscopy (STEM) images illustrating large and small aggregates of Sn nanoparticles, respectively.
Figure 3B:
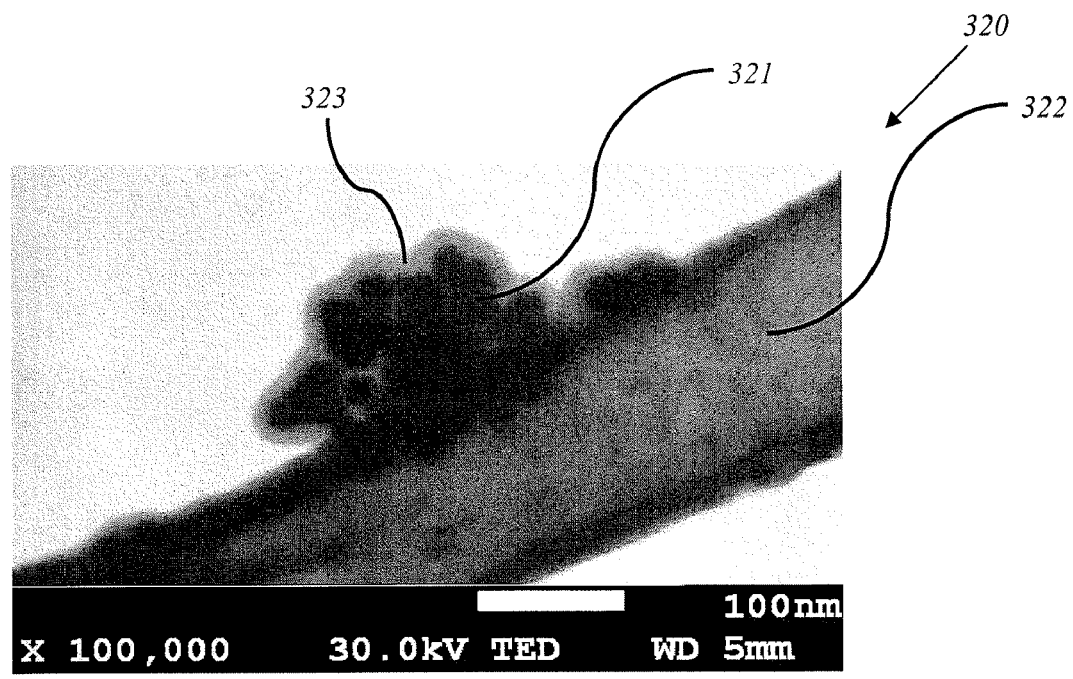

Scanning electron microscopy (SEM) and scanning transmission electron microscopy (STEM) images, shown in FIG. 3A and FIG. 3B, illustrate the ability of the presently disclosed methodology to form relatively large aggregates of Sn nanoparticles, i.e., with diameters on the order of ~300 nm, that are composed of many smaller sized Sn nanoparticles, i.e., with diameters on the order of ~20 nm. For example, FIG. 3A shows a SEM image 310 highlighting aggregated Sn nanoparticles 311 in which the aggregates are about 300 m in diameter. The long fibrous structure 312 is lacey carbon, which provides a support structure for the aggregated Sn nanoparticles 311. The sheet-like material 313 is the polymer used to support the lacey carbon 312. Conductive additives that can be used to provide a conductive path between aggregates include carbon nanomaterials (e.g., nanotubes, nanorods, nanoplates, nanofibers, and the like) and conductive graphite. FIG. 3B, on the other hand, shows a STEM image 320 of smaller Sn nanoparticle aggregates 321 of about 20 nm in diameter. The light grey coating 323 surrounding the nanoparticles is a polymer material trapping the nanoparticles against the lacey carbon 322.

The use of the disclosed methodology is shown to provide Sn nanoparticles having a tighter size distribution as compared to the top-down methodologies. For example, the sizes of the Sn nanoparticles synthesized according to the disclosed methodology are shown to vary within ±5 nm. In comparison, the ball milling methods are known to produce Sn particles having a wide range of sizes, ranging, e.g., from under 1 μm to several microns. In some cases, in order to obtain particles having sizes less than, for example, 1 μm, a filtering may be necessary to remove larger sized particles.

In summary, the presently disclosed "bottom-up" methodology is well suited for use in forming improved anode electrodes of high capacity Li-based batteries, which anode electrodes may comprised of Sn nanoparticles and conductive additives (e.g., carbon nanotubes) for increasing charge capacity with reduced cell volume increase. Introduction of the Sn nanoparticles into the anode electrodes of Li-based batteries increases the anode charge capacity from less than about 400 mAh/gm. to just under 1,000 mAh/gm. By contrast, "top-down" methodologies for forming Sn nanoparticles, e.g., ball milling, result in larger particle sizes with little or poor control over particle size and size distribution.

The synthesis method according to the present disclosure readily and efficiently produces size controllable Sn nanoparticles with median sizes ranging from ~20 nm to several hundred nm via variation of reaction parameters such as concentration of a capping agent, reaction temperature, and reaction duration. In certain embodiments, the synthesis method produced aggregates of Sn nanoparticles having a median size in the range of 20 nm to 100 nm. In other embodiments, the synthesis method can produce Sn nanoparticles aggregates having a median size in excess of 100 nm, up to about 500 nm. In some embodiments, the synthesis method produced Sn nanoparticle aggregates having sizes falling within ±5 nm from the median size. The nanoparticles are colloidal in nature and very stable. Solvent removal results in aggregation into larger particles, which aggregates offer the potential for high charge capacity while retaining size and structure suitable for coupling with (e.g., attaching to, fixed to, or surrounding) conductive additives (e.g., the carbon nanotubes) to form a composite material. U.S. patent application Ser. No. 61/099,342, filed on Sep. 23, 2008, which is incorporated by reference herein in its entirety, provides details on forming such a composite material for a particular battery application.

In the previous description, numerous specific details are set forth, such as specific materials, structures, processes, etc., in order to provide a better understanding of the present disclosure. However, the present disclosure can be practiced without resorting to the details specifically set forth herein. In other instances, well-known processing techniques and instrumentalities have not been described in order not to unnecessarily obscure the present disclosure.

Only the preferred embodiments of the present disclosure and but a few examples of its versatility are shown and described herein. It is to be understood that the present disclosure is capable of use in various other combinations and environments and is susceptible of changes and/or modifications within the scope of the inventive concept as expressed herein.

The foregoing description is provided to enable any person skilled in the art to practice the various embodiments described herein. While the foregoing embodiments have been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art in view of the present disclosure, and generic principles defined herein may be applied to other embodiments. Thus, many changes and modifications may be made to the invention, by one having ordinary skill in the art in view of the present disclosure, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for preparing tin (Sn) nanoparticles, comprising:
   combining a first solution comprising Sn ions with a second solution comprising a reducing agent, wherein, after the combination, the Sn ions and the reducing agent undergo a reaction in which at least some of the Sn ions are reduced to Sn nanoparticles;
   wherein:
   the first solution comprises a tin salt dissolved in a solvent;
   the second solution comprises an alkali metal and naphthalene dissolved in a solvent; and
   the combined solution further comprises a capping agent that moderates a growth of aggregates of the Sn nanoparticles, wherein the capping agent is selected from the group consisting of hydrobenzamide, triphenylphosphine (TPP), trioctylphosphine (TOP), cetyltributylammonium bromide (CTAB), hexylamine, and butylamine.

2. The method according to claim 1, wherein the tin salt comprises an anhydrous tin chloride or a hydrated tin chloride.

3. The method according to claim 1, wherein the tin salt comprises tin (II) chloride ($SnCl_2$).

4. The method according to claim 1, wherein the tin salt comprises tin (IV) chloride ($SnCl_4$).

5. The method according to claim 1, wherein the alkali metal is sodium (Na), lithium (Li), or potassium (K).

6. The method according to claim 1, wherein the second solution is prepared at least in part by dissolving the alkali metal and naphthalene in a solvent.

7. The method according to claim 6, wherein the solvent is selected from the group consisting of tetrahydrofuran (THF), glycol ether, ethylenediamine, and water.

8. The method according to claim 7, wherein if the glycol ether is selected, the glycol ether is glyme or triglyme.

9. The method according to claim 1, wherein the first solution further comprises the capping agent.

10. The method according to claim 1, wherein the reaction produces one or more tin oxide ($SnO_2$) shells at least partly surrounding one or more tin nanoparticles.

11. The method according to claim 1, wherein the reaction is described by:

$$SnCl_2 + 2\ M \rightarrow Sn + 2\ MCl,$$

wherein M is an alkali metal selected from the group consisting of sodium (Na), lithium (Li), and potassium (K).

12. The method according to claim 1, wherein the reaction is described by:

$$SnCl_4 + 4\ M \rightarrow Sn + 4\ MCl,$$

wherein M is an alkali metal selected from the group consisting of sodium (Na), lithium (Li), and potassium (K).

13. The method according to claim 1, wherein the sizes of the tin nanoparticle aggregates are within ±5 nm of a median size of the aggregates.

14. The method according to claim 1, wherein the median size of the tin nanoparticle aggregates is in the range of about 20 nm to about 100 nm.

15. A battery comprising one or more anode electrodes, wherein the one or more anode electrodes comprise aggregates of tin (Sn) nanoparticles coupled to conductive additives, wherein the Sn nanoparticle aggregates comprise a capping agent selected from the group consisting of triphenylphosphine, trioctylphosphine, hexylamine, butylamine, and cetyltributylammonium bromide.

16. The battery according to claim 15, wherein the battery is a lithium battery.

* * * * *